United States Patent [19]

Verdenne et al.

[11] 4,268,202
[45] May 19, 1981

[54] BALE WAGON

[75] Inventors: Serge J. C. Verdenne, Marcilly-Tille; Jean-Marie L. Petitpas, Longvic; Jean-Claude A. E. Boirin, Binges, all of France

[73] Assignee: Sperry Corporation, New Holland, Pa.

[21] Appl. No.: 64,950

[22] Filed: Aug. 9, 1979

[30] Foreign Application Priority Data

Aug. 16, 1978 [GB] United Kingdom .............. 33517/78

[51] Int. Cl.³ .................. A01D 87/12; B60P 1/36; B65G 57/32
[52] U.S. Cl. .................................. 414/39; 198/314; 414/505
[58] Field of Search .............. 414/39, 40, 44, 111, 414/502, 503, 505; 198/313, 314

[56] References Cited

U.S. PATENT DOCUMENTS

| 3,330,424 | 7/1967 | Grey et al. ......................... 414/44 X |
| 3,515,290 | 6/1970 | Hill et al. ........................... 414/44 X |
| 3,517,832 | 6/1970 | Ziechang ........................... 414/44 X |
| 3,572,527 | 3/1971 | Butler ................................. 414/502 |
| 4,047,628 | 9/1977 | Havens ............................... 414/44 |

FOREIGN PATENT DOCUMENTS 1284101 8/1972 United Kingdom .
1453218 10/1976 United Kingdom ............... 414/111

Primary Examiner—Leslie J. Paperner
Attorney, Agent, or Firm—Larry W. Miller; Frank A. Seemar; James R. Bell

[57] ABSTRACT

The invention provides an automatic bale wagon comprising a bale loader, a receiving table in a bale-receiving relationship with the bale loader, and a cross conveyor associated with the receiving table, and operable to convey bales along the receiving table, the conveyor being connected to the loader so as to be pivotable therewith.

8 Claims, 5 Drawing Figures

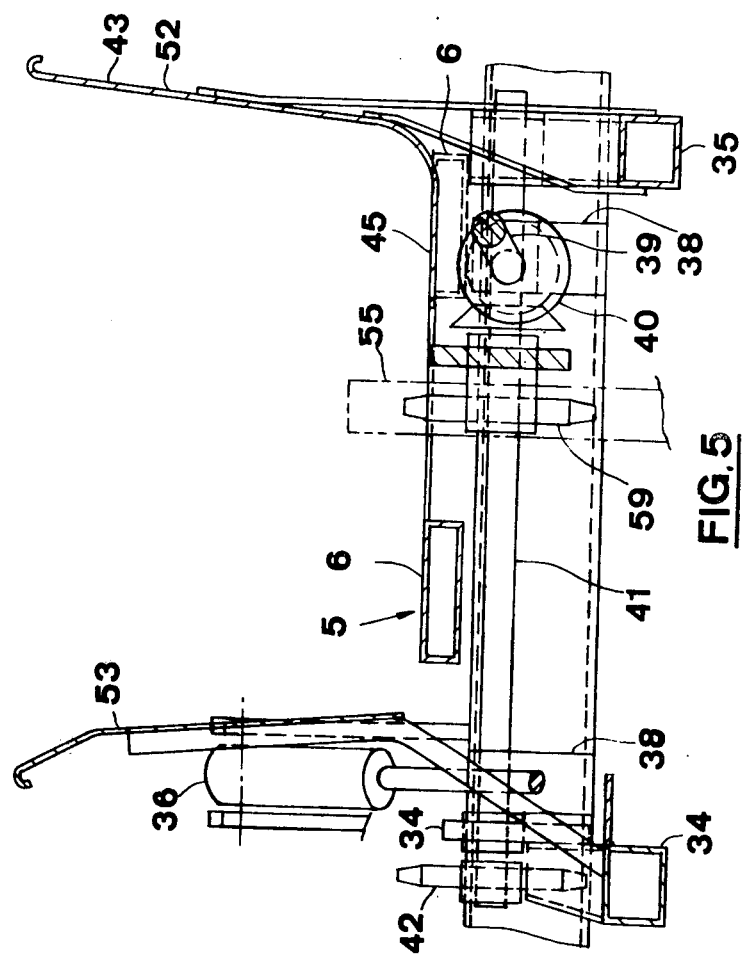

BALE WAGON

BACKGROUND OF THE INVENTION

1. Field of the Invention

This invention relates to bale wagons, i.e. vehicles operable to handle baled products such as bales of hay and straw.

2. Description of the Prior Art

An automatic bale wagon to which the present invention may be applied is described in U.S. Pat. No. 3,572,527 and this wagon is provided with an automatic bale loader which picks up bales from the ground and deposits them on the wagon. In operation, bales enter the loader through deflector arms and engage a substantially vertical conveyor which upends and elevates the bales. After the bales have been elevated to a given height, the upper bale end contacts a guide member which serves laterally to deflect the bales into a bale receiving table. A resiliently mounted bale or guide shoe on the forward portion of the loader frame prevents the bales from falling forward as they are being elevated.

The loader mechanism is provided at one side of the wagon and is pivotally mounted thereon via pivot arms extending outwardly from a fore-and-aft pivot. Hydraulic actuator means extending between the wagon chassis and the loader are adapted to swing the loader upwardly and downwardly around the pivot. The loader may be positioned in a range of angular positions relative to the transverse direction of the wagon to facilitate operation on uneven ground and one hillsides. The loader may even be arranged to float over uneven ground during operation.

Mounted on the chassis, under the receiving table is a short chain conveyor extending from the receiving end of the table adjacent the loader to a point approximately midway along the receiving table. The receiving table is provided with a slot through which extend lugs carried by the chain conveyor, the lugs in use engaging a bale delivered by the loader and moving it to the remote end of the receiving table. The arrangement is such that the first of a pair of bales is not advanced far enough along the receiving table to actuate a trip mechanism. A second bale received on the receiving table is moved laterally by the chain conveyor to force the first bale against the trip mechanism so that when the receiving table has received two bales it is automatically tilted to a vertical position to deposit the pair of bales on a bale transfer table. Successive pairs or layers of bales are accumulated on the transfer table to form a tier of bales. The tier of bales, which may have three, four or more layers, is then transferred onto a load bed where the tiers are then accumulated in side-by-side fashion to form a stack of bales. When a stack of bales has been accumulated on the load bed, the load bed may be pivoted rearwardly to deposit the stack of bales upon the ground.

While the described bale wagon and those similar to it have been reasonably effective, certain drawbacks manifest themselves in particular operating conditions. One of these operating conditions is encountered when wet or damp bales have to be hauled. Of course, in principle, bales should be dry when they are put into storage, but in practice it often happens that the farmer has no alternative to handling such bales. Wet bales have a much higher friction and occasionally such a bale may either remain hanging over the discharge edge of the loader or bridge the gap between the discharge end of the loader and the receiving table. This prevents the cross conveyor on the receiving table from positively grasping the bale and transporting it to the other end of that table.

A similar situation may occur when operating on uneven ground and when the loader mechanism has been raised somewhat relative to the transverse axis of the wagon. In this condition the loader mechanism is positioned at an angle relative to the receiving table and has its discharge edge lifted substantially above the level thereof so that a bale may be suspended over the gap between the loader mechanism and the receiving table, thus being out of reach of the cross conveyor.

In such conditions the operator usually tends to clear the obstruction by momentarily swinging the loader mechanism up and down so as to launch the offending bale onto the receiving table but this is not highly satisfactory.

SUMMARY OF THE INVENTION

It is the object of the present invention to overcome or to attenuate one or more of the foregoing disadvantages. More particurlarly, it is the object to provide a bale wagon with a loader mechanism, receiving table adjacent the loader mechanism and a cross conveyor associated therewith which, under all circumstances, has a positive grasp on the bales loaded by the loader.

According to the present invention a bale wagon is provided comprising a bale loader pivotally mounted on the wagon, a bale receiving table disposed in a bale receviing relationship with the bale loader, and a conveyor associated with the receiving table and operable to convey bales along the receiving table, the conveyor being connected to the loader so as to be pivotable therewith.

The bale loader is mounted to one side of the bale wagon and preferably comprises a pair of opposed side walls bridged by a rear wall to form a U-shaped structure open at its forward end. The loader is inclined to the vertical so that the upper portion thereof is inclined towards the bale wagon. The angle of inclination preferably is of the order of 10°. The upper edge of the side wall adjacent the receiving table is curved towards the latter and forms a bearing edge for bales to tip thereover in being discharged from the loader. The bearing edge is substantially at the level of the receiving table when the loader is in its normal operative position.

The bale loader may be adjustably supported on the wagon by front and rear arms each extending inwardly from the loader and pivotably mounted at their inner end around a generally fore-and-aft extending common pivot axis positioned between the sides of the bale wagon. The pivot axis preferably is positioned substantially at the fore-and-aft centre of the wagon. A hydraulic actuator may extend between the wagon and the loader and be adapted to position the latter relative to the wagon and the ground surface and also to swing the loader from its operative position generally at one side of the wagon to a raised transport position, and vice versa.

An angled bale chute may be attached to the rear arm so that it is pivotable in unison therewith. The bale chute extends inwardly from a location generally adjacent the bale loader to substantially the fore-and-aft centre of the wagon. The bale chute preferably comprises a rear, generally upright wall section and a further wall section joined to the lower edge of the former and extending generally in a forward direction therefrom. When the loader is in the normal operative position, the further wall section extends generally horizontally.

A guide plate, preferably of sheet metal, may be secured to the front arm in a general upright position and at a location spaced forwardly of the aforementioned bale chute. The bale chute and the guide plate together form a bale trough extending transversely of the wagon in a direction inwardly from the loader and which is pivotable in unison therewith around the aforementioned pivot axis.

The conveyor preferably is a chain conveyor, the chain thereof carrying a plurality of bale engaging lugs which extend above the level of the bottom wall section of the bale chute. The conveyor chain extends around a pair of transversely-spaced sprockets, one of which is rotatably mounted on the rear arm, and thus pivotal therewith, and the other of which is arranged co-axially with the aforementioned pivot axis. The latter sprocket is keyed on a drive shaft extending coaxially with the pivot axis.

The receiving table preferably comprises a front and a rear transverse rail which are spaced apart in fore-and-aft direction which, when in the bale-receiving position, are positioned substantially at the same level as the bottom wall section of the bale chute and the conveyor when the loader is in its normal operative position. The front rail extends over substantially the full width of the wagon and has one end adjacent the bale loader discharge end and inbetween the guide plate on the one side and the cross conveyor and the bottom wall section of the bale chute on the other side. The rear rail has a substantially shorter length and extends from generally adjacent the inboard end of the bottom wall section of the bale chute towards the side of the bale wagon opposite to the loader.

BRIEF DESCRIPTION OF THE DRAWINGS

A bale wagon embodying the present invention will now be described in greater detail, by way of example with reference to the accompanying drawings in which:

FIG. 5 is a partial sectional view taken along the line V—V of FIG. 2.

DETAILED DESCRIPTION OF THE PREFERRED EMBODIMENT

In the following description right-hand, left-hand, forward, and rearward references are determined by standing at the rear of the bale wagon and facing in the direction of operative travel.

The general features of the bale wagon are set forth hereinafter to an extent sufficient for the present invention to be appreciated and understood. However, certain components, in particular the hydraulic system by which the various components of the bale wagon are activated and controlled, are shown only diagrammatically or even omitted. Operation of certain of the components, especially the control valves for the hydraulic cylinder units, is initiated by trip mechanisms, cams, etc., the details of which are not shown in the present drawings but are illustrated and described in U.S. Pat. No. 3,706,389 to which attention is directed for a more complete description and illustration of the same.

Figure 1:
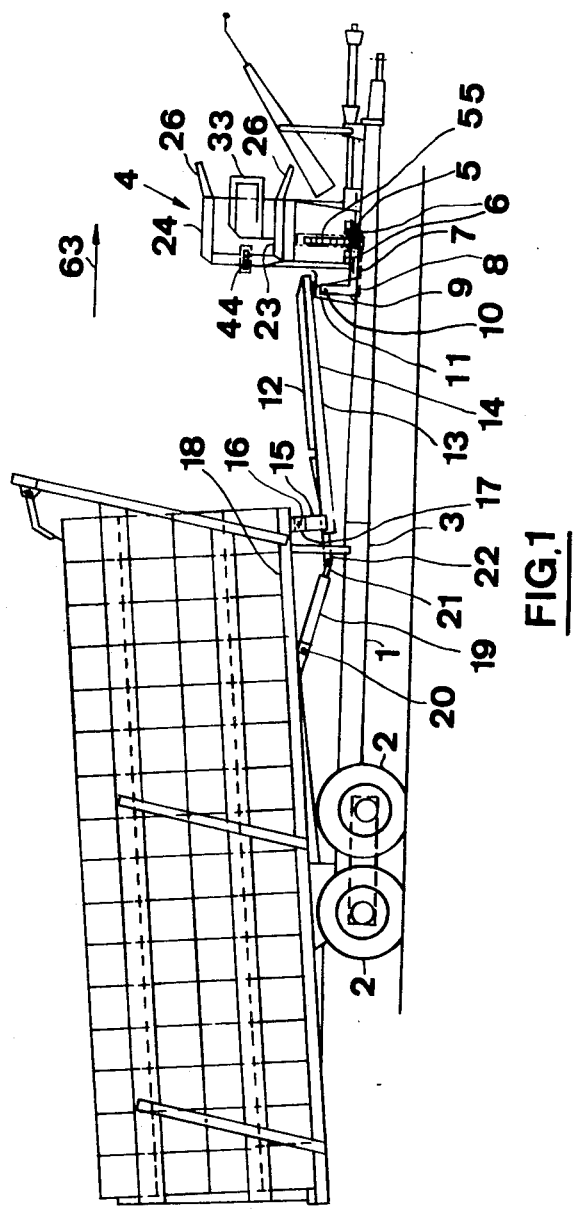
FIG. 1 is a side view of the bale wagon which has an automatic bale loader, a bale receiving table, and a conveyor associated with the latter, the bale loader and conveyor being shown in the raised, transport position.

Referring to the accompanying drawings and particularly to FIG. 1, the bale wagon comprises a chassis, indicated at 1, mounted on two pairs of wheels, only the right-hand ones 2 being seen in FIG. 1. The chassis 1 is formed of left- and right-hand, longitudinally extending rails 3 of which only one is seen in FIG. 1. The forward ends of the longitudinally-extending rails 3 converge in a hitch assembly which adapts the wagon to be secured to a tractor (not shown), or other towing vehicle, located in front thereof. Power for the wagon is obtained from the tractor power-take-off in a conventional manner, but not specifically shown. It should be noted at this point that whilst the bale wagon illustrated in the drawings is adapted to be secured to a tractor having a power take-off shaft, the bale wagon may be self-propelled, or be provided with its own power source.

Mounted on the forward end of the chassis 1 is a bale pick-up mechanism or bale loader 4. The loader 4 will be described in detail hereinafter and it is sufficient to note here that the loader is adapted to pick up bales from the ground and to transfer them to a first or bale receiving table 5. The receiving table 5 comprises a pair of spaced transverse rails 6 mounted on a forwardly-extending, horizontal arm 7 of an L-shaped structure indicated generally at 8. The L-shaped structure 8 comprises a rear, upwardly-extending leg portion 9 which is pivotally secured at 10 to a bracket 11 mounted on the chassis 1. A hydraulic cylinder (not shown) is pivotally secured at one end to the framework of the bale wagon and at the other end to the L-shaped member 8 of the receiving table 5. As the cylinder is extended, the receiving table 5 is swung upwardly about the pivot axis 10, thereby transferring any bales which have been accumulated on the receiving table 5 onto a second or transfer table 12.

The transfer table 12 is mounted on a pair of L-shaped structures 13, each having a forwardly-extending leg portion 14 and an upwardly-extending rear leg portion 15 disposed at right angles to the lower leg portion 14. Each of the upwardly-extending leg portions 15 is secured by a pivot pin 16 to a depending lug 17 mounted on the forward end of the load bed 18. A hydraulic actuator 19 is secured by a pivot pin 20 to the load bed 18, with the rod end 21 of the actuator pivotally connected to a rearwardly-extending arm 22, which itself is fixed by its forward end to the rear portion of one of the L-shaped structures 13 of the transfer table 12.

When the requisite number of bales has been accumulated on the transfer table 12 from the receiving table 5, to form a first tier of bales thereon, the hydraulic actuator 19 is operated by trip means (not shown) so that it extends and causes the table 12 to swing upwardly about its pivot axis 16 through approximately 90°. In this manner, the first bale tier formed on the transfer table 12 is transferred from a generally horizontal position on the table 12 to a generally vertical position on the load bed 18 against a rolling rack (not shown) which thus is forced rearwardly. Successive tiers of bales placed on the load bed 18 by the transfer table 12 will effect further rearward movement of the rolling rack relative to the load bed 18, the tiers of bales being supported in part by the rolling rack.

In the embodiment illustrated in the drawings each layer formed on the receiving table 5 has two bales, and each tier formed on the transfer table 12 has four layers, making a total of eight bales per tier.

The foregoing structure, as broadly outlined above, is well known in the prior art, one example being shown in the aforementioned U.S. Pat. No. 3,706,389.

Figure 3:
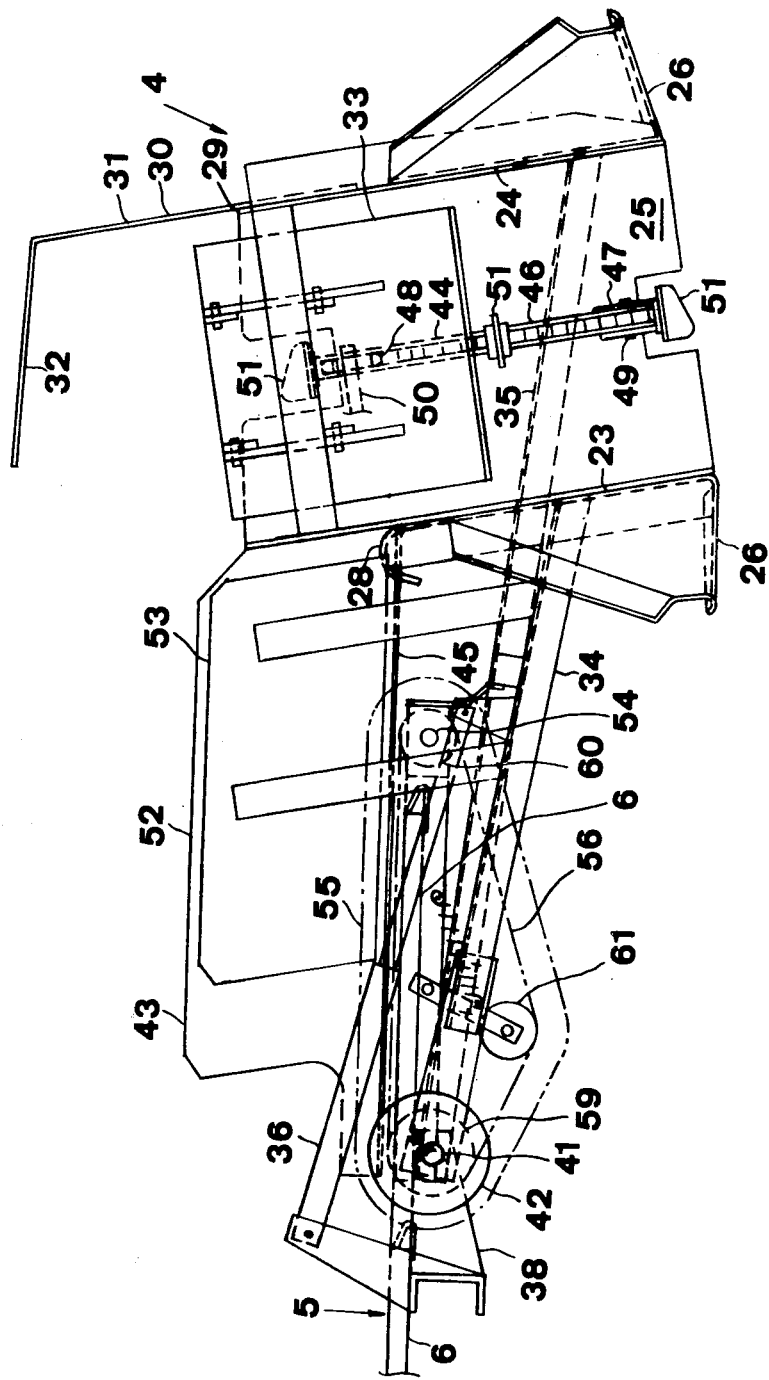
FIG. 3 is a front view of FIG. 2.

The automatic bale loader or pick-up mechanism 4 is mounted on one side of the chassis 1 at the forward end thereof. The loader 4 is supported on the chassis 1 by a front support arm 34, a rear support arm 35, and a hydraulic cylinder 36, the support arms 34 and 35 being pivotally mounted on brackets 38. As best shown in FIG. 3, the loader 4 is mounted at an angle so that the upper portion is inclined toward the receiving table 5. The hydraulic cylinder 36 may be retracted to swing the loader 4 into a raised, transport position (shown in FIG. 1), and the cylinder may also be extended or contracted to position the loader 4 with respect to the receiving table 5 and to the ground surface.

Figure 4:
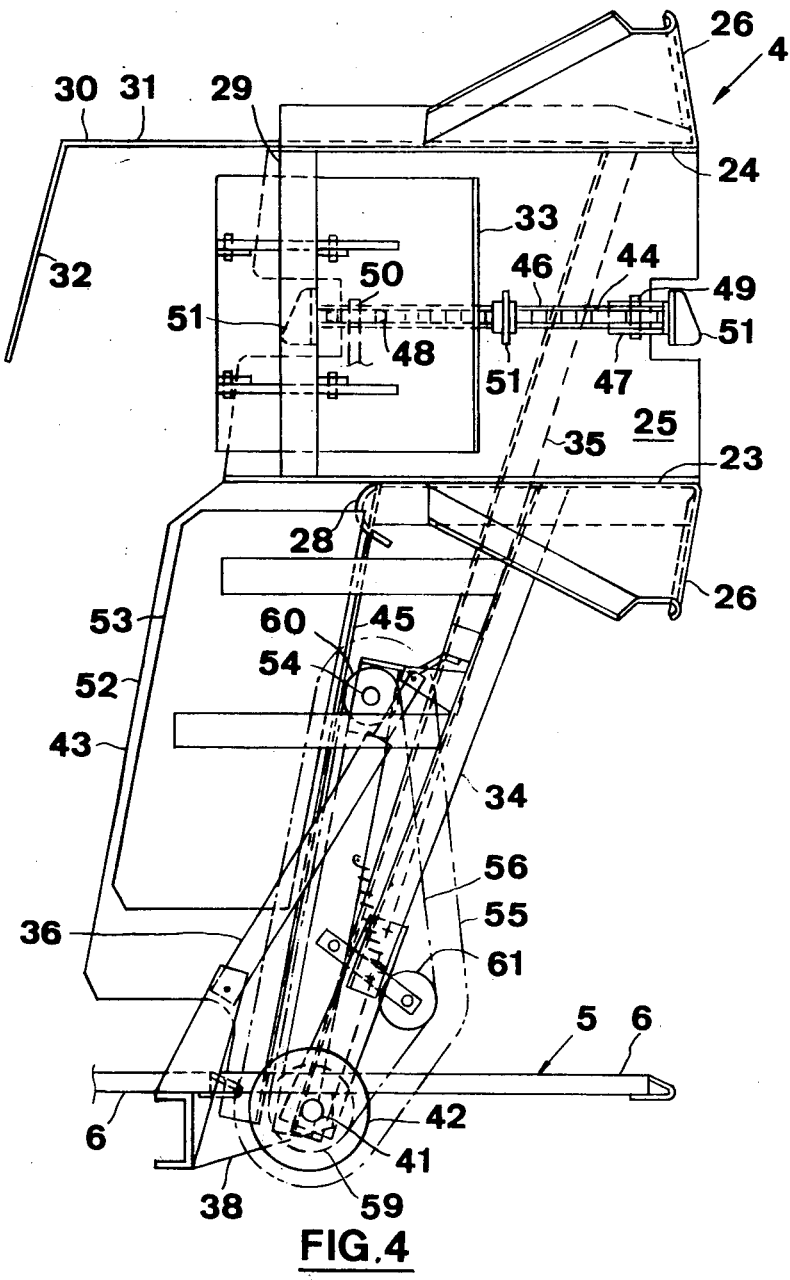
FIG. 4 is a view similar to FIG. 3 but with the loader mechanism and the cross conveyor in the transport position.

The bale loader 4 comprises a pair of normally generally upright side walls 23 and 24 bridged by a rear wall 25 to form a U-shaped frame structure open at its forward end. The lower forward extremities of the side walls 23 and 24 are provided with diverging deflectors 26 which serve to guide the bales into the U-shaped frame. The side walls 23 and 24 also comprise at their lower ends slide shoes or skids (not shown) adapted to ride over the ground surface. The inner side wall 23 has an upper edge 28 generally at the level of the rails 6 on the receiving table 5, this edge being curved outwardly towards the table 5, as shown in FIGS. 3 and 4, to form a bearing edge for bales being lifted by the loader and transferred to the receiving table 5. In operation bales "swing" over and around the bearing edge 28.

The upper edge 29 of the outboard side wall 24 is positioned substantially above the level of the bearing edge 28 of the wall 23 and is provided with an upwardly-extending bale guide member 30 which curves toward the receiving table 5 so to deflect the upper end of each elevated bale. The guide member 30 is made of spring steel and comprises a lower section 31 generally aligned with the outboard side wall 24 and an upper section 32 which is inclined toward the receiving table 5. A yieldable bale shoe 33 is supported on the forward portion of the loader 4.

At the rear end the bale loader 4 comprises a generally upright conveyor 44 comprising a conveyor chain 46 which extends over sprockets 47 and 48 provided on lower and upper shafts 49 and 50. The upper shaft 50 is provided substantially in the plane of the bearing edge 28. The conveyor chain 46 is provided centrally of the rear wall 25 and supports bale engaging prongs or lugs 51 extending outwardly and away from the chain 46.

Figure 2:
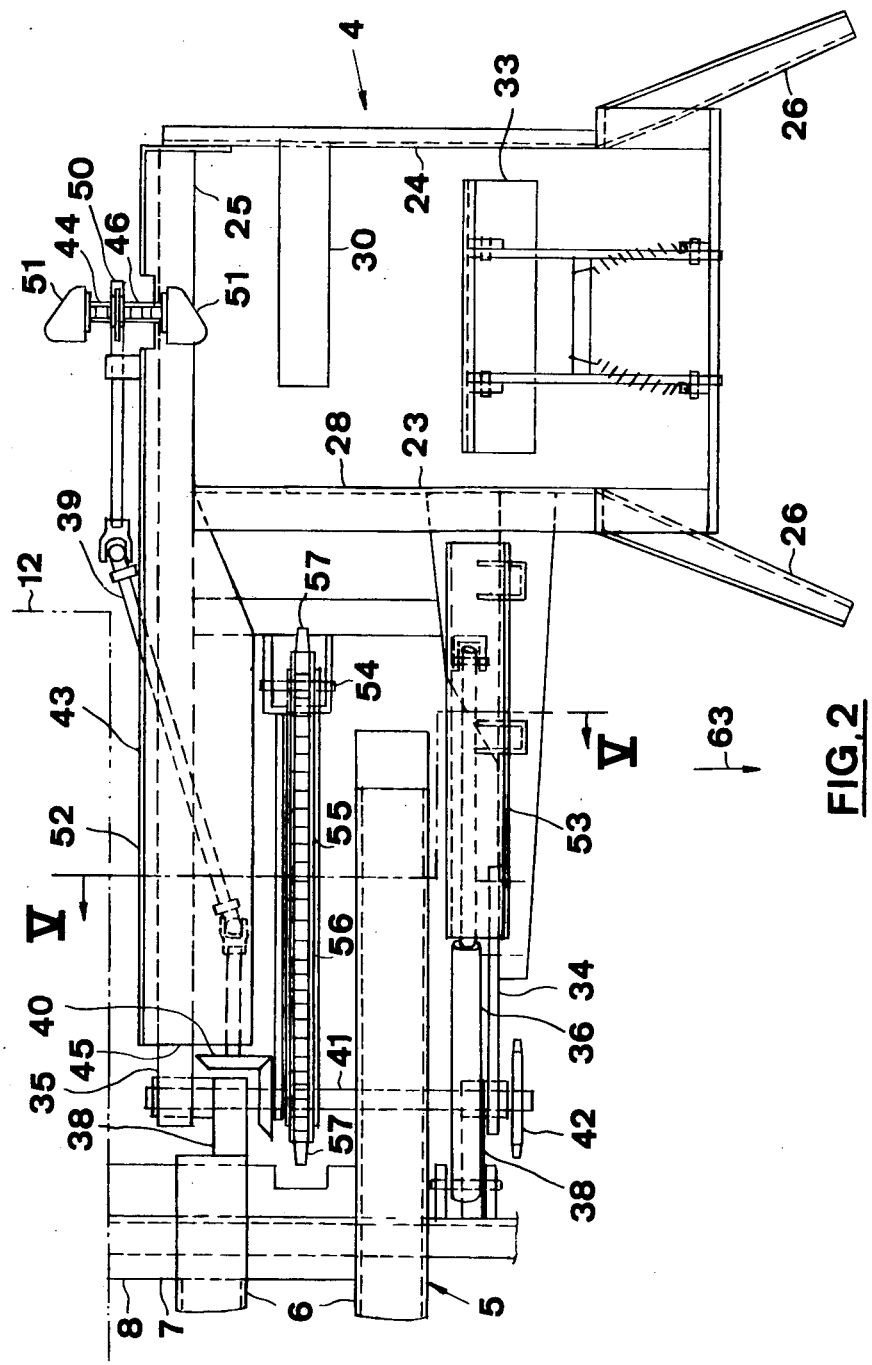
FIG. 2 is a plan view of the bale loader, the receiving table and the conveyor of the bale wagon shown in FIG. 1, but with all components in the normal operative position.

The upper shaft 50 is operatively connected to a universal joint shaft 39 which at its end is coupled to an angled gear transmission 40 (FIG. 2). The angled gear transmission receives its motive power from a fore-and-aft extending shaft 41 arranged coaxially with the pivot axis of the loader 4. The shaft 41 supports at its forward end a sprocket 42 which is drivingly coupled via conventional transmission means to the power source via a main drive shaft of the wagon (not shown). While in this instance, the drive means for the loader has been shown to be a universal joint shaft drive, a belt drive or a hydraulic drive may alternatively be used to drive the conveyor chain 46.

The bale loader 4 and conveyor 44 are generally inclined toward the receiving table 5, as is shown in FIG. 3, so that as a bale is raised by the conveyor 44 it is at an angle to the vertical and will fall on the receiving table 5 when its centre of gravity is above and inwardly of the bearing edge 28 of the side wall 23. The angle of inclination to the vertical of the loader 4 and the conveyor 44 is of the order of 10°.

The receiving table 5 comprises a front and a rear transverse rail 6 which are spaced apart over a short distance in the fore-and-aft direction of the wagon and which are joined together by the aforementioned horizontal arm 7 of the L-shaped structure 8. The front rail 6 extends over approximately the full width of the wagon and has one end adjacent to, and at about substantially the same level as, the bearing edge 28 of the side wall 23 when the loader 4 is in its normal operative position. The rear rail 6 is substantially shorter and has its end remote from the loader 4 generally rearwardly of the corresponding end of the front rail 6. The other end of the rear rail 6 is positioned approximately at the middle of the receiving table 5.

An angled bale chute 43 is secured to the rear support arm 35 of the loader 4 and is pivotally mounted therewith. The bale chute 43 comprises a section 45 which is positioned generally horizontally when the loader is in the lowermost, operative position and which is generally aligned with the rear rail 6 of the receiving table 5 and bridges the gap between the rear rail 6 and the bearing edge 28 of the loader side wall 23. The bale chute 43 further comprises a generally upright wall section 52 which is generally aligned with the rear wall 25 of the loader 4.

A sheet metal guide plate 53 is mounted in a generally upright position at a location forwardly of, and above, the front rail 6 of the receiving table 5 and extending inwardly of the loader from adjacent the forward end of the bearing edge 28. The guide plate 53 is secured to the forward support arm 34 and is movable therewith. The bale chute 43 and the guide plate 53 are thus pivotally movable in unison with the loader 4. The front rail 6 of the receiving table 5 thus partially extends inbetween the bale chute 43 and the guide plate 53.

Mounted on the support arms 34 and 35 and passing around the aforementioned shaft 41 at one end and around a further shaft 54 adjacent the loader side wall bearing edge 28 is a short cross conveyor 55. The cross conveyor 55 comprises a conveyor chain 56 (FIG. 2) carrying a plurality of bale-engaging conveyor lugs 57 and extending around a first and a second sprocket 59 and 60 mounted on the shafts 41 and 54, respectively. The sprocket 59 is keyed on the shaft 41 so as to be driven thereby. The chain 56 also extends around an idler sprocket 61 which is adjustable to give the conveyor chain 56 the correct tension. The lugs 57 of the conveyor 55 project above the bottom plate 45 of the bale chute 43 and also above the front rail 6 of the receiving table 5 when the latter is in its bale receiving position. The conveyor 55 is positioned inbetween the front rail 6 and the forward edge of the horizontal section 45 of the bale chute 43 and extends from the receiving end of the table 5 adjacent the loader unit 4 to a point approximately midway of the receiving table 5. The lugs 57 of the chain conveyor 55 engage a bale delivered by the loader unit 4 and move it towards the remote end of the receiving table 5. It will be appreciated from what precedes that the cross conveyor 55 is pivotable, in unison with the loader mechanism 4, around the pivot shaft 41.

OPERATION

In operation, the bale wagon is propelled forwardly over a field strewn with hay or straw bales, the direction of travel being generally indicated by the arrow 63 in FIG. 1. The bale loader 4 is disposed in its normal operative position closely above the ground level or with its slide shoes or skids riding over the ground surfaces. A bale is guided into the forwardly open frame of the loader 4 by means of the forwardly-extending deflectors 26. As the bale wagon continues to move, the stationary bale is engaged by the rear wall 25 and the generally upright conveyor 44 of the loader mechanism 4. The moving conveyor chain 46 causes one of its lugs 51 to engage the lower corner of the bale and thus lift the bale upwardly into engagement with the lower rounded edge of the guide shoe 33. Continued forward motion of the bale wagon and motion of the conveyor 44 causes the bale to be lifted and tilted to a near vertical position in which the guide shoe 33 holds the bale against the conveyor 44 as it moves upwardly and prevents the bale from falling forward. The conveyor lugs 51 lift the bale bodily from the ground along a path which is inclined inwardly over an angle of about 10° toward the receiving table 5. Continued elevation of the bale drives the bale against the upper section 32 of the resilient guide member 30, which in turn applies a tipping force against the top end of the bale towards the receiving table 5. At that point in the operation, the bale has reached a position where its centre of gravity is spaced substantially above the bearing edge 28 and is at the point of being transferred from the outboard to the inboard side thereof. At the same time, the lower end of the bale is at the point of being released from the conveyor lugs 51 when in their uppermost position.

The tipping force applied by the guide member 30, together with a final launch received from the conveyor 44 as the bale disengages the lugs 51 and the fact that the centre of gravity of the bale passes to the inboard side of the bearing edge 28, causes the bale to swing around the bearing edge 28 and to fall in the gap formed between the upright wall section 52 of the angled bale chute 43 and the further sheet metal guide plate 53 and onto the front rail 6 of the receiving table 5 and the horizontal section 45 of the bale chute 43. The bale is then engaged by the cross conveyor 55 and advanced laterally of the wagon along the receiving table 5. The foregoing is repeated to deposit two or more (usually two) bales in an end-to-end relationship in a transverse direction on the receiving table 5. When a layer is fully completed on the receiving table 5, a trip mechanism (not shown) is actuated whereby the table 5 is pivoted over substantially 90° about the pivot 10 to place the layer of bales onto the forward portion of the transfer table 12. This is repeated several times (usually four) until a tier is completed on the transfer table 12. Each time a further layer is deposited on the transfer bed 12, that layer pushes the layer or layers already deposited thereon further rearwardly. When a complete tier is accumulated on the transfer table 12, a further trip mechanism (also not shown) is actuated causing the transfer table 12 to pivot over substantially 90° around the pivot 16 to deposit the tier on the load bed 18 either against a rolling rack or against the tier or tiers previously placed thereon. The loading of tiers on the load bed 18 is repeated until a full load is accumulated thereon.

The foregoing is a description of the operation of the automatic bale wagon operating under normal conditions and on level ground. However, when working on hillsides or an uneven ground, the loader mechanism 4 may either be caused to ride with its slide shoes over the ground surface or be positioned at a short distance above the ground surface. In both circumstances it may occur that either for a short or for a prolonged period of time, the bale loader 4 is positioned at an angle relative to the receiving table 5 which is greater than the usual 10° and with the side wall bearing edge 28 substantially above the level of table 5. Under these circumstances the cross conveyor 55 in prior art automatic bale wagons has a less than satisfactory grasp on the bales loaded on the receiving table.

However, with the present invention, when the bale loader 4 is in the aforementioned angled position, the angled bale chute 43, the further sheet metal guide plate 53, and the cross conveyor 55 are equally angularly displaced relative to the receiving table 5. Thus any bale picked up with the loader 4 in this angled position is received in the trough formed by the horizontal and upright wall sections 45 and 52 of the bale chute 43 and the sheet metal guide plate 53 and is immediately grasped by the lugs 57 of the cross conveyor 55 which is positioned in the "bottom" of said trough. Thereby the bales are positively and immediately transported toward the remote end of the receiving table 5 irrespective of the angular position of the loader 4 relative to the table 5.

Also, when handling wet bales, the cross conveyor 55 positively grasps any bale that has tipped over the bearing edge 28 and positively "pulls" such bale immediately out of the loader mechanism 4 for transport toward the opposite end of the receiving table 5. When due to the increased friction resulting from an unusually high degree of humidity, a bale remains in a somewhat upright position in the discharge end of the loader 4, rather than tipping over the bearing edge 28, the operator momentarily swings the loader 4 up and down by actuating the cylinder 36 so as to launch the sticking bale over the bearing edge 28. As soon as the bale falls onto the wall section 45 of the bale chute 43, the cross conveyor 55 has a positive grasp thereon irrespective of the angular position of the loader 4 relative to the bale chute.

From what precedes, it will be evident that an automatic bale wagon is provided which is more universal in use than previous automatic bale wagons since under all circumstances the cross conveyor 55 has a positive grasp on the bales loaded by the loader 4 to move them away from the loader along the receiving table 5.

Having thus described the invention, what is claimed is:

1. In a bale wagon having a mobile frame; a bale loader pivotally mounted on said frame and being selectively positionable between an operating position adjacent the ground to receive and elevate bales and a raised transport position, said bale loader having a bale pick-up end positioned adjacent the ground when in said operating position and a discharge end elevated above said bale pick-up end when in said operating position; a bale receiving table mounted on said frame transverse to the direction of travel of said bale wagon, said bale receiving table having a first end positioned adjacent to said discharge end of said bale loader to receive bales discharged therefrom and a remote second end; a conveyor associated with said first end of said bale receiving table and being operable to convey bales along said bale receiving table from said first end toward said second end; and drive means for powering said bale loader and said conveyor, the improvement comprising:

said conveyor being fixedly mounted with said bale loader and pivotable about a first pivot axis between said first end of said bale receiving table and said second end such that said discharge end of said bale loader maintains a fixed positional relationship with said conveyor during pivotal movement of said bale loader between said operating position and said transport position, said bale loader being pivotable with said conveyor about said first pivot axis between said first end and said second end.

2. The bale wagon of claim 1 wherein said bale loader is mounted to one side of said frame, said bale wagon further including front and rear support arms pivotally connected to said frame at said first pivot axis and extending to said bale loader for support thereof outwardly of said frame.

3. The bale wagon of claim 2 further including a bale chute attached to said rear support arm and pivotable with said bale loader to guide bales transported by said conveyor toward said second end of said bale receiving table, said bale chute having an upwardly extending vertical leg and a forwardly extending horizontal leg.

4. The bale wagon of claim 3 further including a generally vertical guide plate attached to said front support arm and pivotable with said bale loader, said guide plate being spaced forwardly of said horizontal leg of said bale chute to form a transversely-extending bale trough to receive bales discharged from said bale loader and to guide bales transported by said conveyor toward said second end of said bale receiving table.

5. The bale wagon of claim 4 wherein said bale receiving table includes a front and a rear transverse rail spaced apart in a fore-and-aft direction, said front rail extends from said first end to said second end and is situated between said bale chute and said guide plate, said rear being substantially shorter in length than said front rail and extends from a position adjacent said horizontal leg of said bale chute to said second end.

6. The bale wagon of claim 5 further including a bale transfer table mounted on said frame rearwardly of said bale receiving table, said bale receiving table being pivotally mounted on said frame at a second pivot axis to transfer bales from said bale receiving table onto said bale transfer table by pivoting said bale receiving table about said second pivot axis and depositing said bales onto said bale transfer bale.

7. The bale wagon of claim 6 wherein said bale loader is inclined at an angle to vertical with said discharge end being horizontally closer to said frame than said pick-up end.

8. The bale wagon of claim 7 wherein said angle of inclination is approximately ten degrees, said first pivot axis being positioned equidistantly between said first and second ends of said bale receiving table.

* * * * *